United States Patent Office 3,824,253
Patented July 16, 1974

3,824,253
PROCESS FOR MANUFACTURING PROPANE SULTONE
Eiji Uematsu, Kunio Ishii, Masayuki Maehara, Hiroshi Takahashi, and Keiichiro Tsuji, Arai, Japan, assignors to Daicel Ltd., Osaka, Japan
No Drawing. Filed Dec. 28, 1971, Ser. No. 213,220
Claims priority, application Japan, Dec. 29, 1970, 46/126,395
Int. Cl. C07d 89/06
U.S. Cl. 260—327 S                    4 Claims

ABSTRACT OF THE DISCLOSURE

A process for preparing propane sultone from a hydroxypropane sulfonic acid containing solution which is characterized by concentrating the solution until the concentration ratio within a specific range is reached and then subjecting the obtained concentrated solution to a continuous distillation in an agitated-film evaporator under a high vacuum of lower than 15 mm. Hg to distill and recover propane sultone.

---

This invention relates to a process for producing propane sultone by continuously distilling a concentrated solution of hydroxypropane sulfonic acid obtained by concentrating a solution containing hydroxypropane sulfonic acid.

More particularly, it relates to a process for producing propane sultone continuously by the steps of concentrating a starting hydroxypropane sulfonic acid containing solution by heating under a reduced pressure until the concentration ratio, which is represented by [the amount of the concentrated solution of hydroxypropane sulfonic acid obtained (parts by weight)/the amount of the solution containing hydroxypropane sulfonic acid charged (parts by weight)]×100%, becomes 0.9–1.2 times as much as the concentration by weight percent of hydroxypropane sulfonic acid in the starting hydroxypropane sulfonic acid containing solution, introducing continuously the obtained concentrated solution of hydroxypropane sulfonic acid into an agitated-film evaporator and distilling the concentrated solution under a high vacuum of lower than 15 mm. Hg, preferably lower than 10 mm. Hg.

It has been known that propane sultone can be produced from a hydroxypropane sulfonic acid solution. The most common process is a process wherein the solution is heated in a batch system at 60–140° C. under a reduced pressure to obtain a concentrated solution of hydroxypropane sulfonic acid, and then the concentrated solution is heated in a batch system at 110–160° C. and distilled under a high vacuum of lower than 5 mm. Hg. In this process the acid is dehydrated and simultaneously produced propane sultone is distilled out. A high vacuum condition is indispensable in this process, and it has been pointed out that, when the process is operated with 2 mm. Hg, the yield of propane sultone will reach about 80% of the theoretical value, but it will reduce to 70% with 20 mm. Hg and 58% with 30 mm. Hg, (refer to Japanese Patent Publication No. 12,735/1970).

However, an industrially available hydroxypropane sulfonic acid contains undesirable inorganic impurities to be derived by the oxidation of bisulfites and sulfites and organic impurities to be derived by the side reaction of bisulfites and allyl alcohol, distinguished from a pure hydroxypropane sulfonic acid containing no such impurities except water; consequently, in a process for producing propane sultone from a concentrated solution of hydroxypropane sulfonic acid in a batch system, it has been found by us that the yield of propane sultone will be greatly reduced when it is exposed to a heating at an elevated temperature for a long time, even though the operation is carried out under the same vacuum condition: for example, when propane sultone is heated and distilled under a vacuum of 5 mm. Hg, the yield of propane sultone will be reduced respectively by 5–10% and 10–20% by prolonging the distilling time from 2 hours to 4 and 8 hours.

Further, in case propane sultone is distilled in a batch system, high-boiling materials will remain at the bottom of the kettle as solid residue, which should be washed and removed each time, resulting in a great reduction of the production efficiency.

It has also been found that, in said crude hydroxy-propane sulfonic acid solution, there are contained a foamable low boiling by-product (I) which will cause a decomposition and foaming of a relatively small extent before the start of distillation of propane sultone and a foamable high boiling by-product (II) which will cause a decomposition and foaming of a relatively large extent during the last stage of distillation of propane sultone. Particularly, due to the formation of the latter by-product (II), even in case the operation is carried out under a high vacuum of 2 mm. Hg, the liquid in the still begins to foam vigorously at the time when the distilled amount of propane sultone exceeds about ⅔ to ¾ of the total amount to be distilled, and when it is too vigorous, the volume of the foams will reach to 5–10 times as much as that of the charged concentrated solution of hydroxypropane sulfonic acid, in spite of stirring to prevent foaming; consequently, there is required an evaporator of a large capacity in order to avoid the over-flow out of the still. This is not economically preferable, as it results in a great reduction of space time yield during the distillation. That can be, of course, avoided by stopping the distillation before the foaming begins, but it is not preferable because it will cause a remarkable loss of propane sultone.

Also, a batch-wise distillation on an industrial scale is not desirable, as it will elevate the still temperature owing to the increase of the liquid depth in the still, which will have an adverse effect that can not be ignored.

Thus, a batch process for producing propane sultone by heating a concentrated solution of hydroxypropane sulfonic acid for a long time is merely a process in a laboratory.

We have made a search for establishing an industrial process for overcoming the above-described defects of prior art processes and for producing propane sultone from hydroxypropane sulfonic acid continuously with a good yield and discovered a novel process for obtaining propane sultone with a yield as high as about 85%, wherein a starting hydroxypropane sulfonic acid containing solution is concentrated by heating, preferably under a reduced pressure of 15–40 mm. Hg, until the concentration ratio, which is represented by [the amount of the concentrated solution of hydroxypropane sulfonic acid obtained (parts by weight)/the amount of the solution containing hydroxypropane sulfonic acid charged (parts by weight)]×100% becomes 0.9–1.2 times, preferably 0.94–1.05 times, as much as the concentration by weight percent of hydroxypropane sulfonic acid in the starting hydroxypropane sulfonic acid containing solution, and the obtained concentrated solution of hydroxypropane sulfonic acid is introduced continuously into an agitated-film evaporator, where the concentrated solution is distilled under a high vacuum of lower than 15 mm. Hg, preferably lower than 10 mm. Hg to obtain propane sultone.

In the above-described process, in case a concentrated solution of hydroxypropane sulfonic acid having a concentration ratio which will remain to be more than 1.2 times as much as the concentration by weight percent of hydroxypropane sulfonic acid in the starting hydroxypropane sulfonic acid containing solution is used, the fomable low boiling by-product (I) described above remains in the solution, which will generate a large amount of incondensable gas mainly consisting of sulfur dioxide gas formed by the decomposition of said by-product, and when the gas is formed too much, the degree of vacuum will be reduced to 40-70 mm. Hg to stop the distillation of propane sultone; even when propane sultone can be distilled, it will only be produced at such a low rate of distillate in the range of 10 to 50%. In order to avoid this phenomenon, there may, of course, be considered to empoly an evacuating device which can suck a large amount of incondensable gas and has a large capacity of gas extraction enough to maintain a high degree of vacum. However, in order to produce a high vacuum of 3 mm. Hg, for example an evacuating device of a capacity 3 times as much as that for 30 mm. Hg might be required, and it is not advantageous in industry to remove incondensable gas with a high degree of vacuum.

On the other hand; when the concentration ratio is lower than 0.9 times as much as the concentration of the hydroxypropane sulfonic acid solution, a part of propane sultone which has been produced in the concentration step will be disadvantageously lost together with other volatile components.

According to the process of this invention, the concentrated solution of hydroxypropane sulfonic acid can be distilled within a very short period of time less than a few minutes and, therefore, the reduction of yield due to a prolonged heating can be avoided. Consequently, the production of solid kettle residues is small and, therefore, it is possible to discharge the high boiling residual solution continuously in a state of liquid from the distillation of propane sultone. Further, the decomposition and foaming of by-product is not so vigorous, and propane sultone can be obtained with a good yield and with a very high space time yield.

The agitated-film evaporator to be used in the present invention may be either a horizontal type or a vertical type generally known in the art (for example, refer to Chemical Engineer's Handbook edited by John H. Perry and published by McGraw-Hill Book Company, Inc., 4th Edition, 11–28). In such agitated-film evaporators, agitation blades are installed within a cylindrical or conical jacket by maintaining a clearance of 1 to 3 mm. and they will be driven by an outside motor. In operation, a supplied solution will be spread uniformly over the whole heating surface by the centrifugal force of the rotating agitation blades and simultaneously the formed liquid film will be agitated, while effecting the desired evaporation. Further, the agitated-film evaporator may be a type having movable blades provided at the ends of the agitation blades which will be operated by the centrifugal force due to the rotation of the agitation blades. End surfaces of these movable blades will be pressed on a heat-conducting surface of the jacket to conduct a scraping action. The jacket part is heated by steam or a suitable heating medium.

As the high boiling residue to be discharged from the agitated-film evaporator has such a property that its viscosity increases extremely to cause the reduction of its fluidity as the distilled amount of propane sultone is increased, it is recommended to make the amount of said residue as small as possible within the limit that it can be discharged in a state of liquid. Further, in case the high boiling residue thus discharged still contains a small amount of propane sultone which can be distilled, it will be subjected to a recovery distillation, if necessary.

The starting hydroxypropane sulfonic acid containing solution useful as raw material in this invention is a reaction mixture solution containing hydroxypropane sulfonic acid as the main component which can be obtained by the known processes. (For example, refer to British Pat. 782,093 of Boehme Fettcheme and BRD Auslege. 1,206,431 of Shell.) For example, the corresponding alkali metal salt of hydroxypropane sulfonic acid is produced by the reaction of allyl alcohol with an alkali metal bisulfite in the presence of an alkali metal sulfite in an aqueous medium by using oxygen, an oxygen-containing gas or an oxygen-liberating agent as reaction initiator and it is then converted to hydroxypropane sulfonic acid by cation exchange or by using an inorganic acid such as hydrochloric acid to convert the salt to the free acid.

The invention will now be explained by reference to the nonlimiting examples below.

EXAMPLE 1

A concentrated solution of hydroxypropane sulfonic acid produced by concentrating a solution containing 31.7% (percent is by weight, here and hereinafter) of hydroxypropane sulfonic acid under the vacuum of 20 mm. Hg to the concentration ratio of 30.5% was continuously introduced into an agitated-film evaporator at the rate of 19.6 kg./hr. and the distillation was carried out under the vacum of 4 mm. Hg. Propane sultone was obtained at the rate of 16.1 kg./hr. and the yield thereof based on hydroxypropane sulfonic acid was 85%.

Comparative Example 1

The concentrated hydroxypropane sulfonic acid used in Example 1 was distilled in a batch system under the vacuum of 4 mm. Hg for 4 hours but the yield of propane sultone was 74%.

EXAMPLE 2

The same operation as mentioned in Example 1 was performed, except the vacuum in the agitated-film evaporator was changed to 7 mm. Hg. Propane sultone was obtained at the rate of 15.8 kg./hr. and the yield thereof based on hydroxypropane sulfonic acid was 86.5%.

EXAMPLE 3

A solution containing 30.0% of hydroxpropane sulfonic acid was concentrated under the vacuum of 18 mm. Hg to the concentration ratio of 30.9%, and the obtained concentrated solution of hydroxypropane sulfonic acid was continuously introduced into the agitated-film evaporator used in Example 1 at the rate of 7.3 kg./hr. and the distillation was carried out under the vacuum of 4 mm. Hg. Propane sultone was distilled at the rate of 5.96 kg./hr. and the yield thereof based on hydroxypropane sulfonic acid was 84%.

Comparative Example 2

The same hydroxypropane sulfonic acid containing solution used in Example 3 was concentrated under the vacuum of 18 mm. Hg to obtain the concentration ratio of 37.0%, and the obtained concentrated solution of hydroxypropane sulfonic acid was subjected to the same operation as used in Example 3. Within a few minutes after the concentrated solution was fed into the evaporator, the degree of vacuum decreased to 40 mm. Hg due to the generated incondensable decomposition gas, propane sultone was distilled out only at the rate of 3.5 kg./hr. and the yield thereof based on hydroxypropane sulfonic acid was only 56%. Further, the high boiling residue in the evaporator was subjected to a distillation under the vacuum of 4 mm. Hg to collect propane sultone, but the total yield increased up to 64% only.

What we claim is:

1. A process for producing propane sultone from an aqueous solution of hydroxypropane sulfonic acid obtained by treating an aqueous solution of alkali metal salt of hydroxypropane sulfonic acid by cation exchange or by an inorganic acid to convert said salt to hydroxypropane sulfonic acid, which consists essentially of the steps of:

concentrating only said starting aqueous solution of hydroxypropane sulfonic acid by heating same under a pressure of from 15 to 40 mm. Hg until the amount of the concentrated solution of hydroxypropane sulfonic acid thereby produced, in parts by weight, divided by the amount of said starting aqueous solution, in parts by weight, multiplied by 100%, is equal to from 0.9 to 1.2 times the concentration, in weight percent, of hydroxypropane sulfonic acid in said starting aqueous solution;

and then continuously introducing the thus-obtained concentrated aqueous solution of hydroxypropane sulfonic acid into an agitated film evaporator and therein continuously distilling said concentrated solution under a pressure of lower than 15 mm. Hg, to obtain propane sultone as distilate.

2. A process acording to Claim 1, in which, in said agitated film evaporator, the concentrated aqueous solution of hydroxypropane sulfonic acid is spread as a thin film uniformly over an externally heated surface and the film is continuously agitated by agitation blades as it moves along said surface.

3. The process as claimed in Claim 1, in which the concentration of said starting aqueous solution is carried out until the concentration ratio becomes 0.94 to 1.05 times as much as the concentration by weight percent of hydroxypropane sulfonic acid in said starting aqueous solution.

4. The process as claimed in Claim 1, in which the distillation in the agitated-film evaporator is carried out under a pressure of lower than 10 mm. Hg.

References Cited

FOREIGN PATENTS

| 12,735 | 1970 | Japan | 260—327 S |
| 782,093 | 9/1957 | Great Britain | 260—327 S |
| 1,206,431 | 12/1965 | Germany | 260—327 S |

OTHER REFERENCES

Chemical Engineer's Handbook, ed. John H. Perry (McGraw-Hill, 4th Ed.), pages 11 to 28.

JOHN D. RANDOLPH, Primary Examiner

C. M. S. JAISLE, Assistant Examiner